United States Patent [19]
Kiss

[11] 3,810,549
[45] May 14, 1974

[54] DREDGE AND SLUDGE ALEMBIC

[76] Inventor: Sandor Gyorgy Kiss, 236 E. Sunset, Lombard, Ill. 60148

[22] Filed: Nov. 24, 1972

[21] Appl. No.: 309,239

[52] U.S. Cl............... 210/297, 210/298, 210/313, 210/319, 210/383
[51] Int. Cl............................................ B01d 33/02
[58] Field of Search............ 210/158, 388, 523–526, 210/297, 298, 313, 319, 383; 209/173, 458–462

[56] References Cited
UNITED STATES PATENTS
| | | | |
|---|---|---|---|
| 2,281,609 | 5/1942 | Walter | 210/526 X |
| 1,542,288 | 6/1925 | D'Olier | 210/158 |
| 3,656,624 | 4/1972 | Walton | 210/523 X |

FOREIGN PATENTS OR APPLICATIONS
| | | | |
|---|---|---|---|
| 234,067 | 6/1964 | Austria | 210/525 |
| 53,328 | 2/1890 | Germany | 209/461 X |

Primary Examiner—Granville Y. Custer, Jr.
Assistant Examiner—Craig R. Feinberg
Attorney, Agent, or Firm—Elmer L. Zwickel

[57] ABSTRACT

A combination dredge and sludge alembic, the latter comprised of a sludge receiving tank having vibratory means in its interior for settling out the sludge solids or residue, and a screen means through which discharged water must flow. The alembic, which may be stationary or portable, or mounted on a barge or dredge, is suitably located to permit the location of conveyor means therebeneath for transporting the slurry therefrom.

7 Claims, 9 Drawing Figures

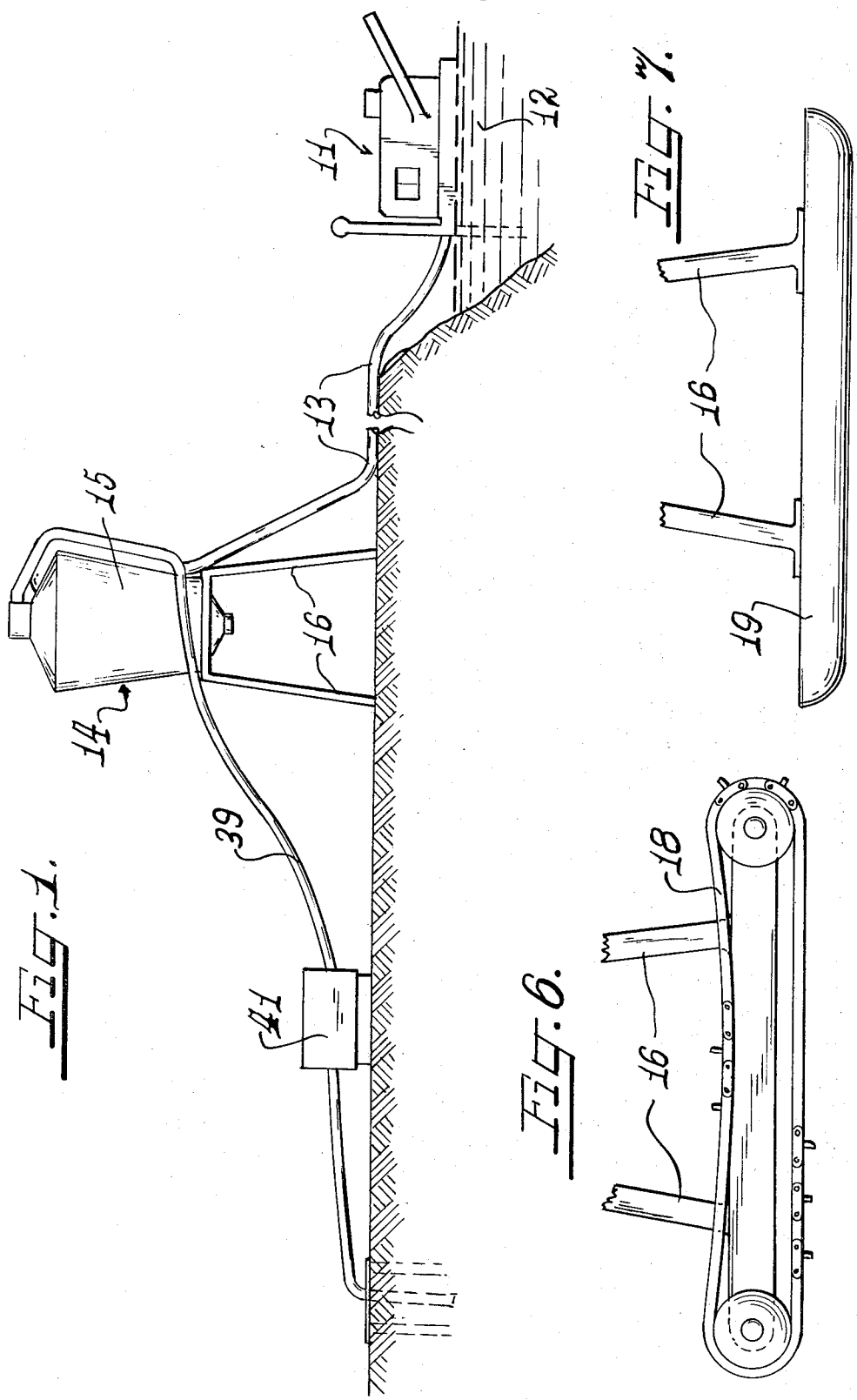

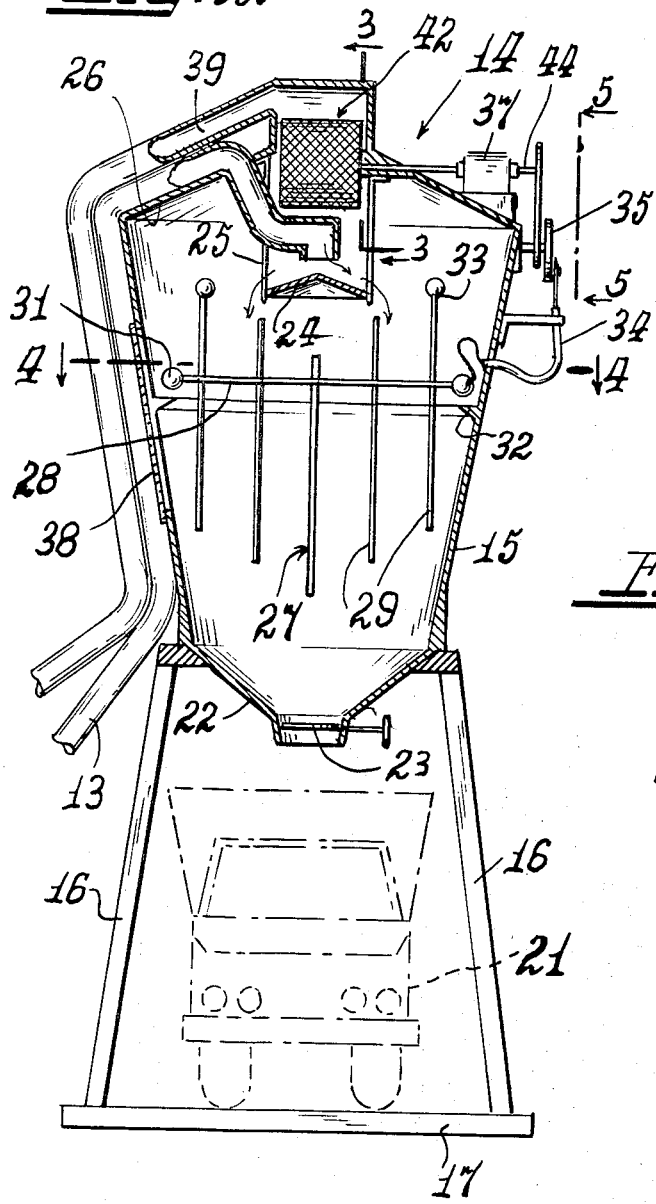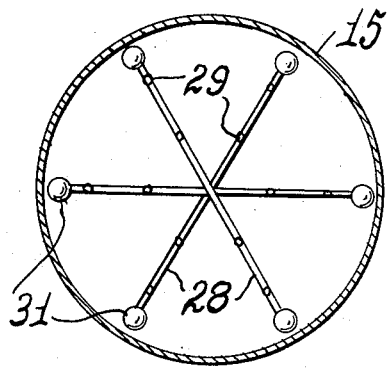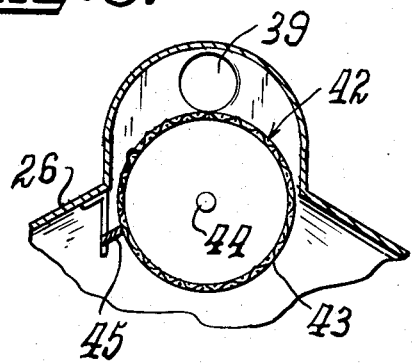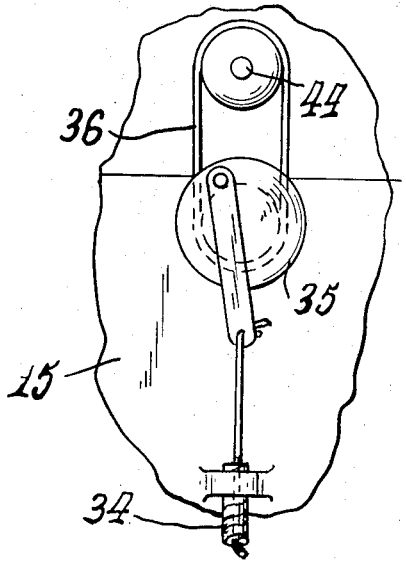

DREDGE AND SLUDGE ALEMBIC

The invention relates to improvements in sludge settling and de-watering equipment such as may be used to separate sludge solids from it's fluid medium as when dredging out rivers, harbors, etc. The equipment is particularly useful in instances where the deposit of sludge must be transported away from the site of the dredging although it is useful for on-site discharge. The water removed can be flowed through a filter system and clorinated and then back to its place of origin or it may be dischsrged into an available sewer. The equipment may be permanently installed or it may be mobile.

More particularly, the residue of the dredging operation is conveyed through a conduit into the sludge settling unit (alembic) where the solids are settled out of the water by mechanical and gravity means and the water is discharged through a filter for disposal. The filter preferably has associated with it suitable brush or scrapper means which functions to keep the filter clear of solids. When a predetermined quantity of sludge is collected in the unit it is discharged into any suitable conveyor means such as railroad car, a truck, or the like or it may be discharged directly on the ground like, needed as a fill.

It is therefore an object of this invention to provide an improved sludge alembic.

Another object is to provide, in a structure of this character, improved positive means to effect settling out of the solids from it's liquid medium.

Another object is to provide, in a structure of the character referred to, improved water filter means.

Another object is to provide a sludge alembic with novel means to impart portability thereto.

Another object is to provide apparatus of the character referred to with a novelly constructed shaking or vibrating element.

Another object is to provide a structure of the character referred to which is not expensive or difficult to manufacture, operate or maintain servicable, and which is very efficient.

Other objects and advantages of the invention will become apparent with reference to the following description and accompanying drawings.

In the drawings:

FIG. 1 is a schematic view of the installation of the sludge alembic in the sludge flow line leading from an hydraulic dredge.

FIG. 2 is a vertical sectional view of the alembic, showing parts in elevation.

FIG. 3 is a sectional view of the screen assembly, taken substantially on line 3—3 of FIG. 2.

FIG. 4 is a horizontal sectional view taken substantially on line 4—4 of FIG. 2.

FIG. 5 is an elevational detail view of the drive means for the vibratory unit.

FIG. 6 is a detail view of a traction mount for the alembic.

FIG. 7 is a detail view of a pontoon mount for the alembic.

Figure 8:
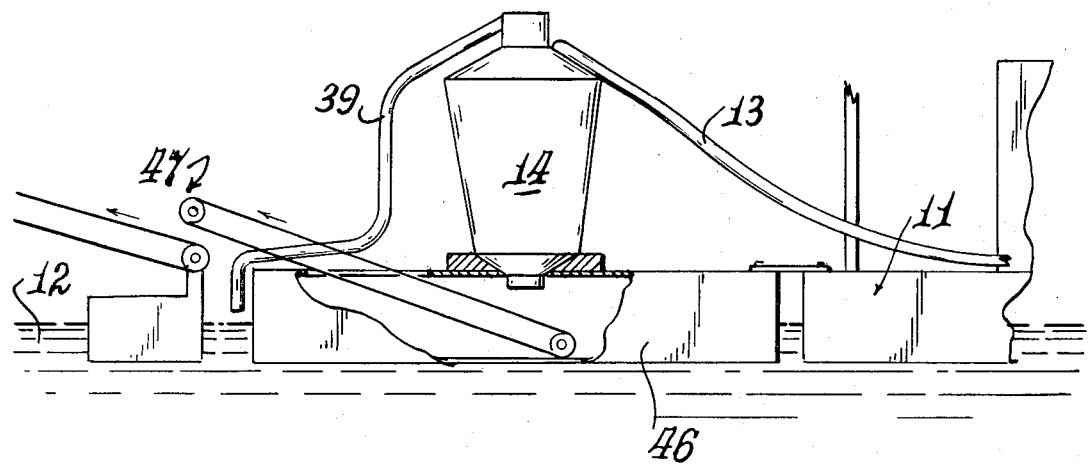
FIG. 8 is an elevational view of a barge mounted alembic.

Referring to the exemplary illustration of the hydraulic dredge system and sludge alembic, shown in FIG. 1 of the accompanying drawings, the system may include a hydraulic dredge 11 operable to lift sludge from a body of water 12. A flow line 13 for the recovered sludge leads from the dredge to the upper end of the sludge alembic generally indicated at 14.

The sludge alembic, best shown in FIG. 2, comprises a tank 15, preferably cylindrical in shape, which is supported in a vertical position at a desired elevation by suitable legs 16. These legs may have their lower ends anchored in a platform or base 17, or they may mount suitable catapillar treads 18 (FIG. 6) on pontoons 19 (FIG. 7). in the latter instances the alembic is portable on land or water should such usage be desired or required. However, when arranged on land, either immobile or mobile, the legs 16 are of sufficient height and are sufficiently spaced apart to enable a heavy capacity truck 21 or a railroad car to pass therebeneath for loading with sludge solids separated from the entraining liquid in the tank 15. For this purpose, the bottom of the tank 15 preferably is funnel shaped, as at 22, and is provided with a suitable normally closed gate valve 23.

Water entrained slurry is discharged from the flow line 13 into the upper extremity of tank 15, as shown, and over the top of a connical dispenser 24 suspended rigidly by strap hangers 25 or the like, from the top wall 26 of tank 15. The disbursed slurry falls downwardly into the tank and in order to assist gravity and settle the slurry in the bottom portion of the tank there is a cage or rod-like vibrator 27 arranged within the tank.

The vibratory means 27 preferably is comprised of a series of substantially horizontally disposed rods 28 to which there is secured, as by welding, a plurality of vertical rods 29. The vertical rods are spaced from one another as shown, and preferably are of various effective lengths arranged with the inner or centrally located rods shorter at their upper ends and longer at their lower ends than the next adjacent rods as the outside diameter is approached.

The horizontal rods 28 preferably have resilient bumpers 31 on their ends which normally (when at rest) seat upon an internal shoulder 32 in the tank wall to limit their movement downwardly. The top ends of the outermost vertical rods 29 also have similar bumpers 33 which cushion the vibrator should it be carried into an extreme upper position. Horizontal agitation of the vibrator is accomplished by means of a bowden type cable 34 that extends to the outside of the tank and has the other end of its inner wire connected to an eccentric 35 which is rotatably driven, through a belt drive 36, by a motor 37. In operation, as the wire of the bowden cable is reciprocated, the settling rods or cage 27, which is free floating will reciprocate horizontally and vertically, the latter depending upon the resistance offered by the sludge being thereby accumulated in the lower portion of the tank 15.

If desired, a level gauge or window 38 may be provided in the tank wall to enable the operator to determine when the accumulation of sludge has reached a sufficient level to warrant the opening of the gate valve 23 for discharging the sludge therefrom onto the land or into the truck 21, or a railroad car.

Water entering the tank 15 is under pressure at all times and it fills the tank from which it flows through a conduit 39, connected in the top wall of the tank, and which carries the water therefrom preferably through a filtering and clorinizing unit 41 for ultimate discharge into a man-hole of a sewer system, or otherwise.

However, before leaving the tank 15, the water passes through a water filter and silt retainer assembly 42. As best shown in FIG. 3, this assembly comprises a cylindrical cage 43 consisting of fine mesh wire screen mounted on the shaft 44 of a motor 37. Of course, a separate motor can be provided for the screen and for the vibrator if so desired. The screen is maintained free of silt by a brush 45, or like scrapper, that bears at all times against the screen surface.

FIG. 8 shows the sludge alembic 14 mounted on a barge 46 trailing the dredge 11. The barge is provided with a conveyor system 47 which operates to carry the residue to a designated site.

Figure 9:
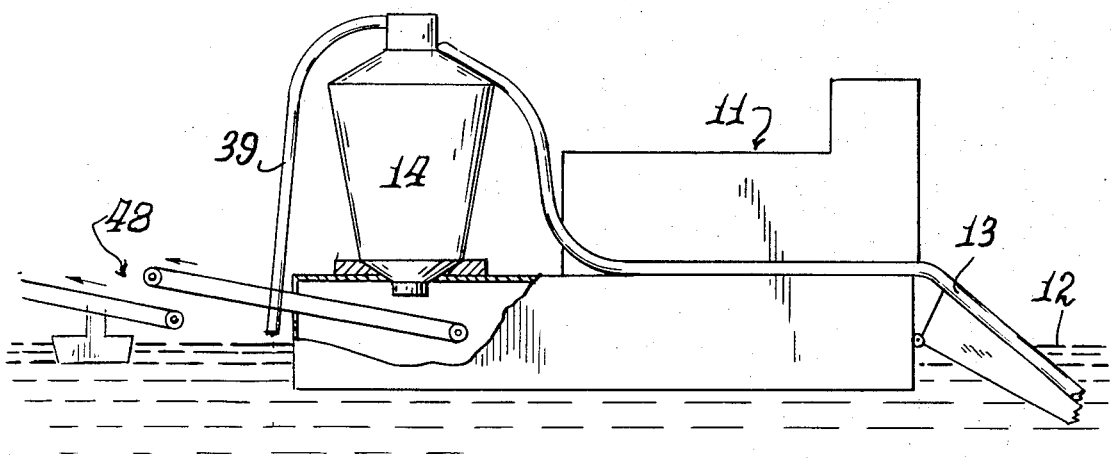
FIG. 9 is an elevational view of a dredge mounted alembic.

In the FIG. 9 disclosure, the sludge alembic 14 is mounted directly on the dredge 11 with it's discharge 22 located over a conveyor system 48 designed to convey the residue to a designated site.

It should be quite evident that the equipment described herein is especially useful in areas where it is required that the sludge residue be carried away from the work site. However, it can be used effectively for beach environment, dikes or enbankments or road construction by advancing the alembic along the path of the areas where the solids are to be discharged. This may be referred to as the direct discharge method.

Although I have described preferred embodiments of my invention, in considerable detail, it will be understood that the description thereof is intended to be illustrative, rather than restrictive, as details of the structure may be modified or changed without departing from the spirit or scope of the invention. Accordingly, I do not desire to be restricted to the exact construction shown and described.

I claim:

1. In a sludge alembic, a tank including a top wall and a bottom wall, a sludge inlet in its top wall, a disbursing element below said inlet, a water discharge line in flow communication with the interior of the tank through the top wall, rotatable filter means in said water discharge line, a slurry discharge opening through the bottom wall, a gate normally closing said slurry discharge opening, free floating vibratory means in said tank, a power source outside said tank, flexible means connecting said power source to the vibratory means operable to vibrate said vibratory means, and means in said tank to restrain excessive downward movement of the vibratory means.

2. In the sludge alembic recited in claim 1, wherein the inlet to the water discharge line and the filter means is located above the sludge inlet.

3. In the sludge alembic recited in claim 1, wherein the flexible means comprises a cable.

4. In the sludge alembic recited in claim 1, wherein restraining means comprises an internal flange in the tank underlying the peripheral margin of the vibratory means.

5. In the sludge alembic recited in claim 1, wherein scrapper means is associated with the filter means.

6. In the sludge alembic recited in claim 1, wherein cushioning means is carried by the vibratory means.

7. In the sludge alembic recited in claim 1, wherein the vibratory means comprises a cage-like structure.

* * * * *